United States Patent [19]

Blazek

[11] Patent Number: 5,355,834
[45] Date of Patent: Oct. 18, 1994

[54] CATTLE BARRIER

[76] Inventor: James V. Blazek, Box 423, Rosetown, Saskatchewan, Canada, S0L 2V0

[21] Appl. No.: 86,114

[22] Filed: Jul. 6, 1993

[30] Foreign Application Priority Data

Jul. 3, 1992 [CA] Canada .................................. 2073091

[51] Int. Cl.$^5$ .......................... A01K 5/00; A01K 3/00
[52] U.S. Cl. .................................. 119/51.11; 119/60; 256/10
[58] Field of Search ................... 119/20, 51.01, 51.11, 119/58, 60, 703; 256/10

[56] References Cited

U.S. PATENT DOCUMENTS

| | | | |
|---|---|---|---|
| 2,691,359 | 10/1954 | Anstiss et al. | 119/20 |
| 3,112,731 | 12/1963 | Lako et al. | 119/51.12 |
| 3,504,892 | 4/1970 | Crist | 256/10 |
| 3,805,741 | 4/1974 | Thompson et al. | 119/20 |
| 3,882,825 | 5/1975 | McFadden | 119/20 |
| 3,908,599 | 9/1975 | Flocchini | 119/20 |
| 3,972,307 | 8/1976 | Marseillán | 119/20 |
| 4,004,781 | 1/1977 | Pereda | 256/10 |
| 4,006,714 | 2/1977 | Goossen | 119/20 |
| 4,078,771 | 3/1978 | Diggs | 256/10 |
| 4,779,570 | 10/1988 | Pereda | 119/20 |
| 5,054,430 | 10/1991 | Weelink | 119/60 |

FOREIGN PATENT DOCUMENTS

| | | | |
|---|---|---|---|
| 2564681 | 11/1985 | France | 256/10 |
| 2115671 | 9/1983 | United Kingdom | 256/10 |

*Primary Examiner*—Robert P. Swiatek
*Attorney, Agent, or Firm*—Murray E. Thrift; Adrian D. Battison; Stanley G. Ade

[57] ABSTRACT

A feeding control apparatus controls feeding times and durations in a feed yard in which a bulk supply of feed is stored at one end of the yard. The apparatus includes an electrified barrier that extends across the yard and a mechanism for advancing the barrier against the feed during feeding times and withdrawing it from the feed at other times. The movement of the barrier is under the control of a programmable timer. The feeding and withdrawn positions of the barrier are readily adjusted so that they can be advanced along the yard as the animals eat into the supply of feed.

27 Claims, 5 Drawing Sheets

CATTLE BARRIER

FIELD OF THE INVENTION

The present invention relates to animal feeding and has particular application to the feeding of animals such as cattle in a feed yard.

BACKGROUND

It is common practice to feed cattle on hay in a feed yard. The hay, commonly supplied in large round bales, as loose hay or in square bales, is usually delivered to the yard in quantities that allow the cattle to eat continuously and to waste excess feed. Considerable labor is expended in moving hay from a storage site away from the animals to the feed yard.

An objective of the present invention is to provide a novel system and system components for controlling the feeding of animals in a feed yard so as significantly to reduce the labor time from that involved with conventional feeding techniques.

SUMMARY

According to one aspect of the present invention there is provided an apparatus for controlling the feeding of animals in a feed yard with a bulk supply of feed stored in the yard, the apparatus comprising:

barrier means extending across the yard between the animals and the bulk supply of feed;
barrier moving means for moving the barrier means between a feeding position adjacent supply of feed and a withdrawn position spaced therefrom;
control means for operating the barrier moving means at predetermined times;
limit means operatively associated with the barrier moving means for stopping the barrier moving means when the barrier reaches the feeding and withdrawn positions, the limit means being adjustable for advancing the feeding position towards the bulk supply as the feed is progressively eaten back into the bulk supply.

Preferably the barrier is electrified.

A large volume of feed may be stored in the feed yard. Feeding is then controlled by limiting the animals' access to the feed with the moveable barrier. With a timed control, the system may be used to feed animals at a preset time of day, for a predetermined time, with no need to move either the feed to the animals or the animals to the feed. It is only necessary periodically to advance the feeding position of the barrier. Preferably, both the feeding and withdrawn positions will be advanced, allowing the cattle to clear up any spilled hay.

According to another aspect of the present invention there is provided apparatus for controlling the feeding of animals in a feed yard, with a bulk supply of feed stored in the yard, the apparatus comprising:

rail means extending along opposite sides of the yard;
barrier means extending across the yard and having opposite ends mounted on the respective rail means for movement therealong;
barrier moving means for moving the barrier along the rails towards and away from the bales of feed; and
control means for controlling the barrier moving means to advance the barrier means towards the supply of feed at selected feeding start times and to withdraw the barrier means from the bales of feed at selected feeding end times.

The rails may be supported on fences along opposite sides of the yard for guiding the movement of the barrier along the yard. Limit devices, for example limit switches may be adjustably mounted on the rails to define the feeding and withdrawn positions of the barrier.

According to a further aspect of the present invention there is provided an electric animal barrier comprising a plurality of elongate, substantially parallel, uninsulated electric conductors arranged in an annular array, means for connecting one conductor of each two adjacent conductors to a source of electric power, and means for connecting the other conductor of each two adjacent conductors to ground.

The alternate electrified and grounded conductors ensure that an animal contacting the barrier will complete a path to ground between two of the conductors. The annular array avoids the need to maintain a particular orientation of the barrier so that the barrier can be suspended by the ends under tension. Minimum physical structure is required of the barrier.

According to a further aspect of the invention there is provided a method of feeding animals confined in a feed yard, comprising:

providing a bulk supply of feed in the yard;
providing barrier means between the animals and the bulk supply of feed at a withdrawn position spaced sufficiently from the feed to prevent animal access to the feed;
moving the barrier means to a feeding position adjacent to the feed at selected feeding times to provide animal access to the feed;
withdrawing the barrier means from the feeding position to the withdrawn position after a selected feeding period; and
advancing the feeding position towards the bulk supply as the feed is progressively eaten back into the bulk supply.

Using this method, animals may be fed on a continuous, controlled basis with no need to transport either feed or the animals.

BRIEF DESCRIPTION OF THE DRAWINGS

In the accompanying drawings which illustrate an embodiment of the present invention.

DETAILED DESCRIPTION

Figure 1:
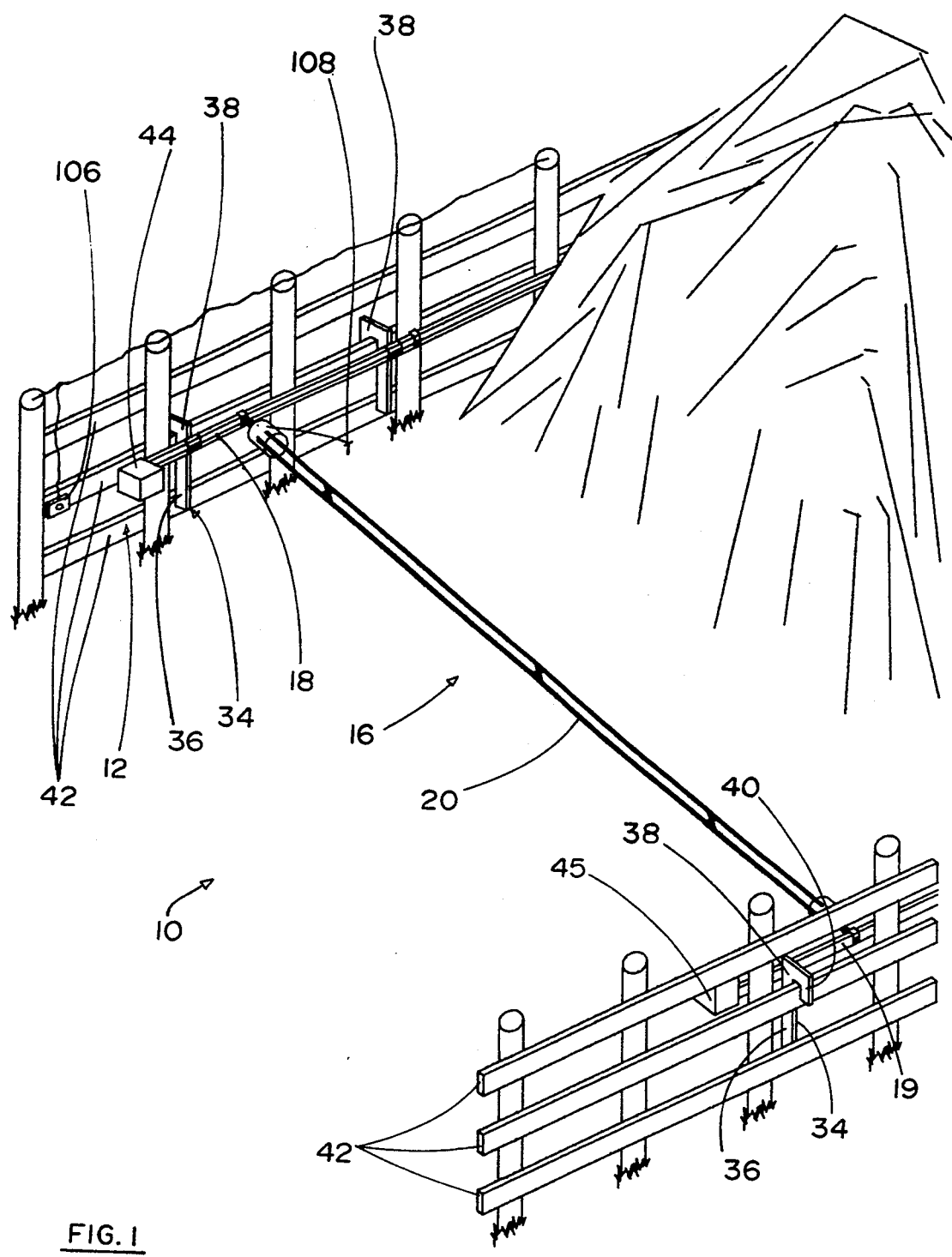
FIG. 1 is an isometric representation of the feeding system installed in a feed yard.

Referring to the accompanying drawings, especially to FIG. 1, there is illustrated a feed yard 10 bounded by a fence 12 and having a bulk supply of feed 14 at one end of the yard. To control animal access to the bulk supply of feed, the yard is equipped with a feeding control apparatus 16. This includes two rails 18 and 19 mounted along the fence at opposite sides of the yard and a barrier 20 that is carried by the rails for movement towards and away from the supply of feed.

Figure 3:
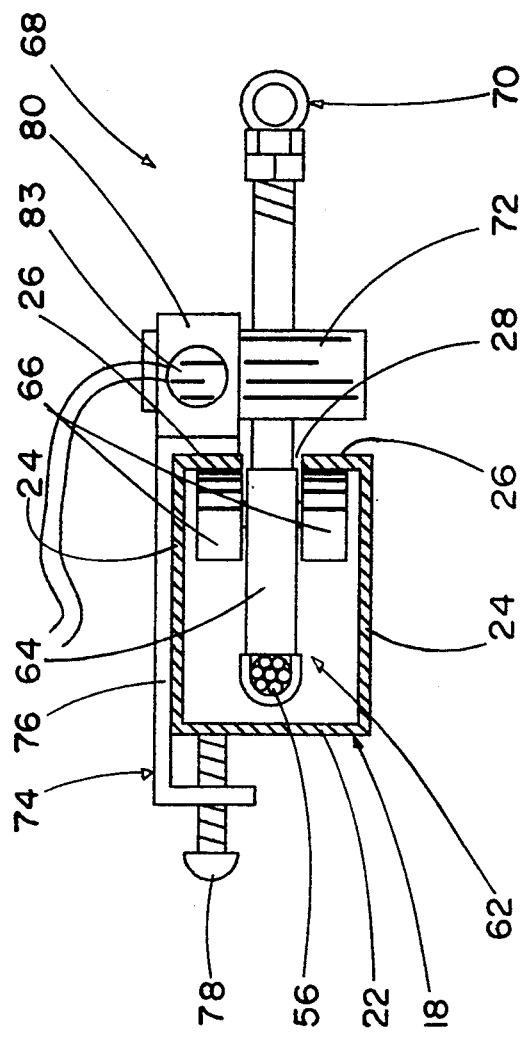
FIG. 3 is a cross section along line 3—3 of FIG. 2.
Figure 2:
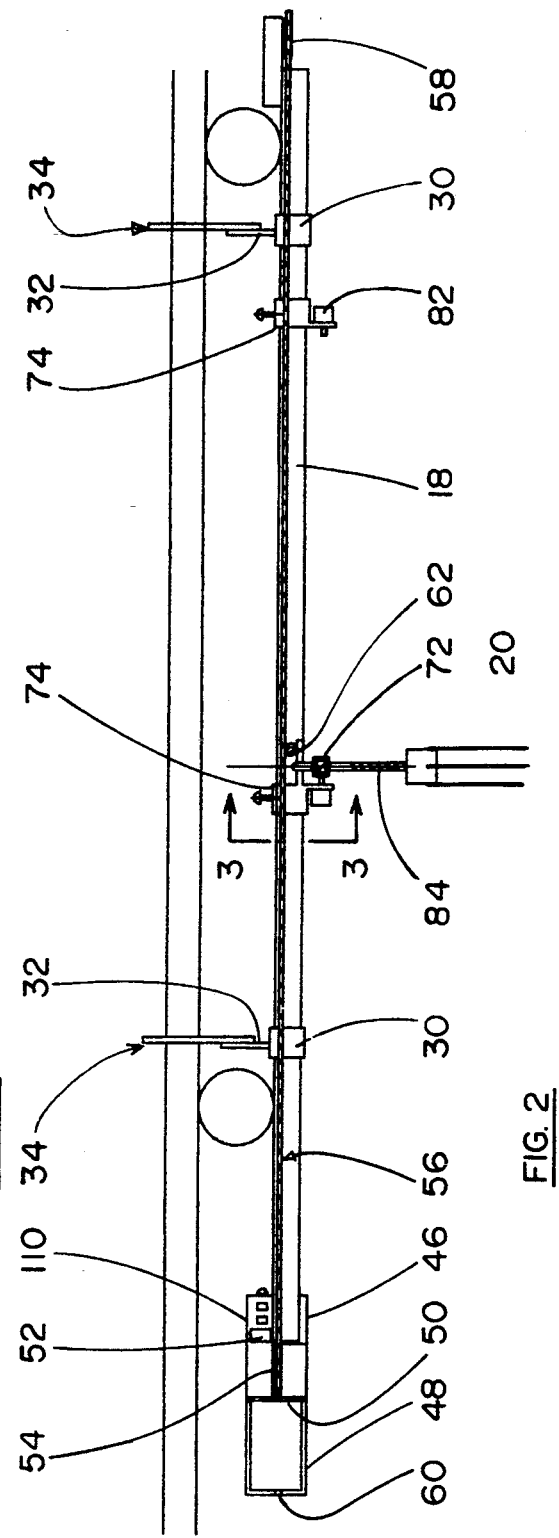
FIG. 2 is a plan view of one side of the system.
Figure 4:
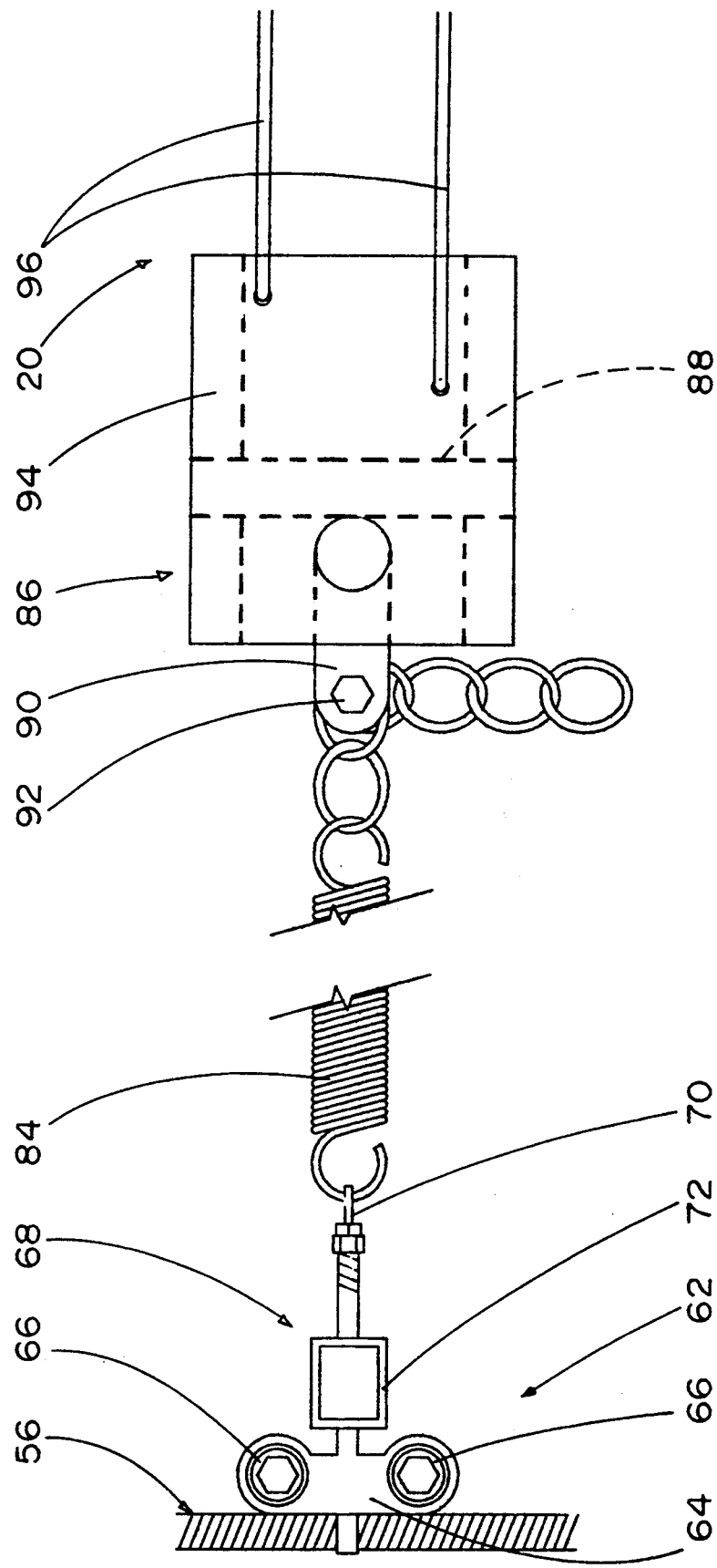
FIG. 4 is a top view of one end of the barrier showing the configuration of the rail follower and barrier support.

As illustrated most particularly in FIGS. 2 and 3, each of the rails 18 and 19 is a C-shaped channel with a base web 22, two side flanges 24 at right angles to the base web and two short flanges 26 extending partially across the open side of the channel and leaving a slot 28 along the open side. The rail is mounted on a fence using clamps 30 that match the shape of the rail and that are secured to rail support bars 32. Each of the bars is in turn carded by a rail engaging hook 34 with a long inner upright 36, an upper cross member projecting from the top of the inner upright end and a short outer upright 40. The overall configuration of the hook 34 is that of an inverted J. In use, the inner upright engages the inner faces of two fence stringers 42, while the cross member 38 rests on the top of the upper stringer and the outer upright 40 engages the outside of the upper stringer. This mounting arrangement allows mounting of the rail on the fence by hooking the support hooks 34 onto the fence stringers. This also provides for a simple adjustment of the location of the rails along the fence.

At one end of the rail 18 is a housing 44. A similar housing 45 is mounted on the end of rail 19. Each housing has a base 46 fixed to the associated rail and a cover 48 mounted on the base by a hinge 50. Two motors 52 and 53 (FIG. 7) are mounted inside the housings 44 and 45 respectively. Each motor drives a pulley 54 aligned with the end of the associated rail. The pulley carries a cable 56 that extends the length of the rail and around a pulley 58 at the opposite end.

One reach of the cable extends along the inside of the rail, while the other is outside of the rail. The cable enters the housing 44 through a slot 60 in the cover.

The barrier 20 is carded on the rails by rail followers 62 inside the respective rails. Each follower includes a carriage 64 carrying a set of rollers 66 engaging the insides of the flanges 26. The carriage is connected to the cable 56 so that it will travel along the rail with the cable. A support 68 is secured to the carriage and projects through the rail slot 28 to an eye 70. The support 68 of each of the followers carries a switch actuator 72 immediately outside the flanges 26. This is used to actuate two limit switches that are mounted on the rail by respective switch brackets 74. Each switch bracket includes a channel 76 which fits over the upper part of the rail 18 and is fixed to the rail by a set screw 78 with a wing head. The channel carries a flange 80 projecting to the side of the rail beyond flanges 26. A forward limit switch 82 is mounted on one of the flanges 80 with its actuator projecting from the flange towards the switch actuator 72 on the follower 62 so that when the follower reaches the position of the limit switch, it will actuate the limit switch. A similar reverse limit switch 83 is mounted on the flange 80 of the other bracket 74. The two confronting limit switches 82 and 83 to operate as described more fully in the following.

The barrier 20 is carried by the two supports 68. At each end, it includes a coil spring 84 connected to the support eye 70 and a barrier support 86. The barrier support includes a cross 88 carrying a clevis 90 connected to the end of the spring 84 by a pin 92. The cross 88 carries an insulating support ting 94. Stretched between the two support rings on opposite sides of the yard are four electric conductors in the form of bare wires 96. Between the support tings 94, the wires are kept separated by cruciform spacers 98 which are formed by tubular cross arms 100. A slot in the side wall of each cross arm, near the end, accommodates one of the wires. A retainer pin 104 extends into the end of the cross arm to hold the wire in the slot.

Two of the wires, which are diametrically opposed, are connected electrically to a conventional electric fence controller 106 (FIG. 1) so that those conductors of the barrier are electrified. The other two conductors are connected to a ground 108. Consequently, when an animal comes into contact with two adjacent ones of the wires, a deterrent shock will be delivered to ensure the animal will move away from the barrier.

Figure 7:
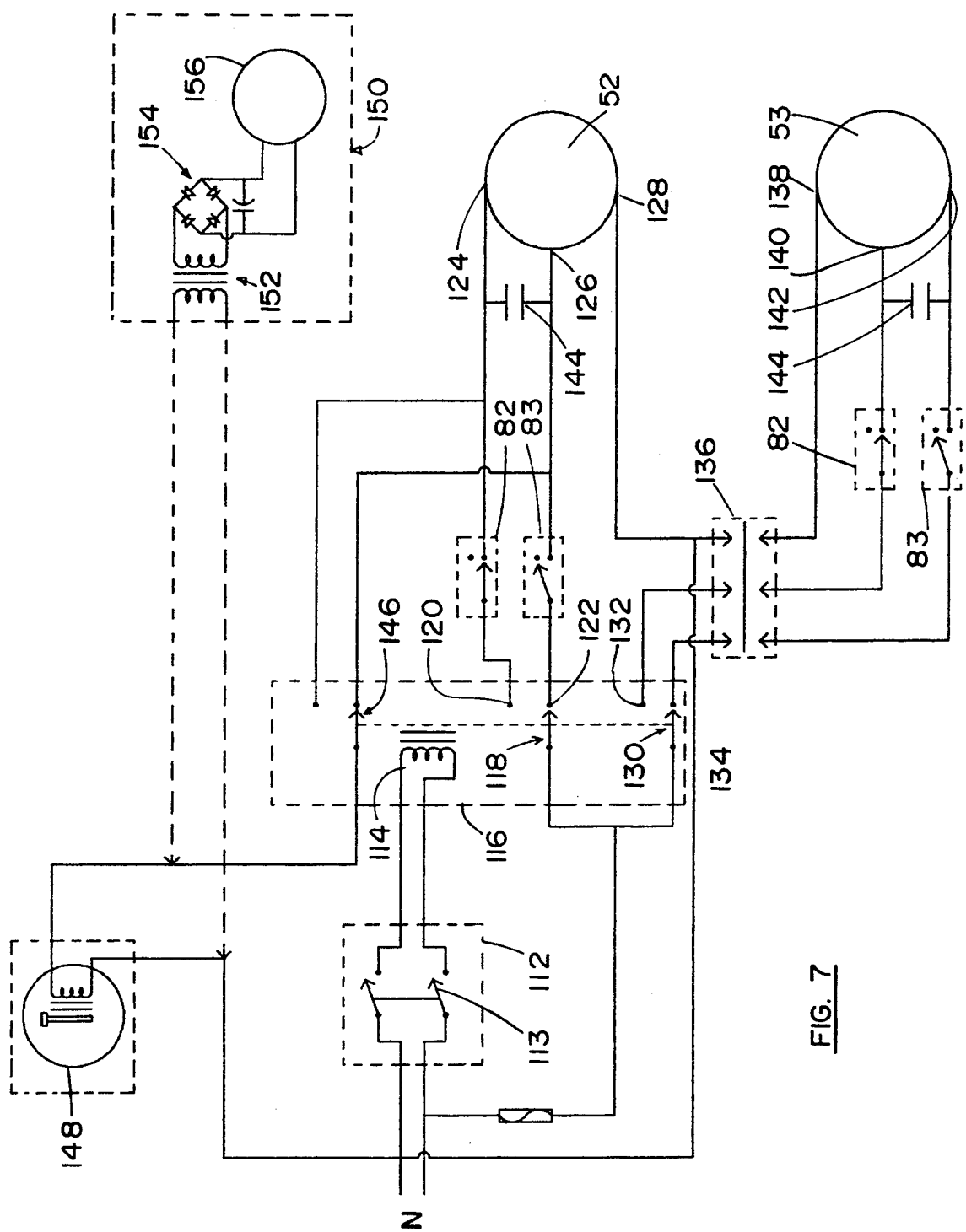
FIG. 7 is an electrical schematic of the barrier drive means.

The two motors controlling the movement of the barrier 20 are controlled by a control unit 110 in the housing 44. A schematic showing the components of the control is illustrated in FIG. 7. As shown in that drawing, the control unit includes a timer 112 that may be set to close a double pole timer switch 113 for a selected duration at any desired time of the day. The timer is connected to a 120 volt AC power source and delivers power, when switch 113 is closed, to a coil 114 of a three pole relay 116.

One set of contacts 118 of the relay has a forward terminal 120 connected to the forward limit switch 82 on rail 18. It also has a reverse terminal 122 connected to the reverse limit switch 83 on the second rail. Those two limit switches 82 and 83 are connected to the forward and reverse terminals 124 and 126 respectively of the motor 52. The moveable contact of the set 118 is connected to the live side of the AC power supply while the neutral terminal 128 of the motor is connected to the neutral side of the power supply.

A second set of contacts 130 of the relay 116 includes a forward terminal 132 and a reverse terminal 134 that are connected through a connector 136 to the limit switches 82 and 83 respectively on the rail 19. The limit switches are in turn connected to the forward terminal 138 and reverse terminal 140 of the motor 53. The neutral terminal 142 of the motor is connected through the connector 136 to the neutral side of the power supply.

A capacitor 144 bridges the forward and reverse terminals of each motor.

A third set of contacts 146 has two terminals connected to the forward and reverse terminals of the motor 52, while the moving contact of this set of contacts is connected to a 120 volt AC bell 148. An alternative alarm 150, also illustrated in FIG. 5, includes a step down transformer 152, a rectifier-filter 154 and a DC bell 156.

In operation of the system, the track 18 and the associated components operate as a master track, with the track 19 operating as a slave track. With the control circuit set as illustrated in FIG. 7, the various switches are in the non-feeding or withdrawn condition. The forward limit switches are closed and the reverse limit switches are opened by contact with actuators 72. The relay contacts are supplying power to the open reverse limit switches. At the desired feeding time, the timer switches 113 close, supplying power to the relay 116. This switches the relay contacts to supply power through the closed forward limit switches to the motors 52 and 53. At the second time, the bell 148 is energized to ring. The motor 52 and the bell both shut off when the forward limit switch is opened by the actuator 72. Similarly, the motor 53 is shut off when the associated forward limit switch is open. The unit is then in the feeding cycle and will remain so as long as the timer supplies power to the relay.

The feeding cycle ends when the timer switches 113 open. With no power applied to the relay, the relay contacts return to their normal positions. Because the reverse limit switches 83 are now closed, the motors will be driven in reverse and the bell will ring. The motors will run until the reverse limit switches 83 open. The unit remains in this mode until the timer closes the switches again.

While the unit is in the feeding cycle, the forward limit switches can be adjusted and the motors will turn on to advance the barrier until the limit switches open.

Figure 5:
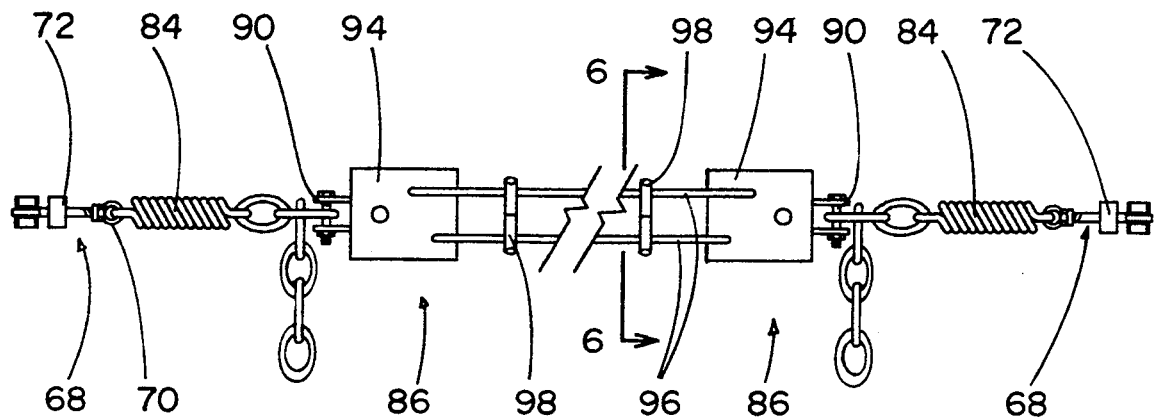
FIG. 5 is a front view of the barrier.
Figure 6:
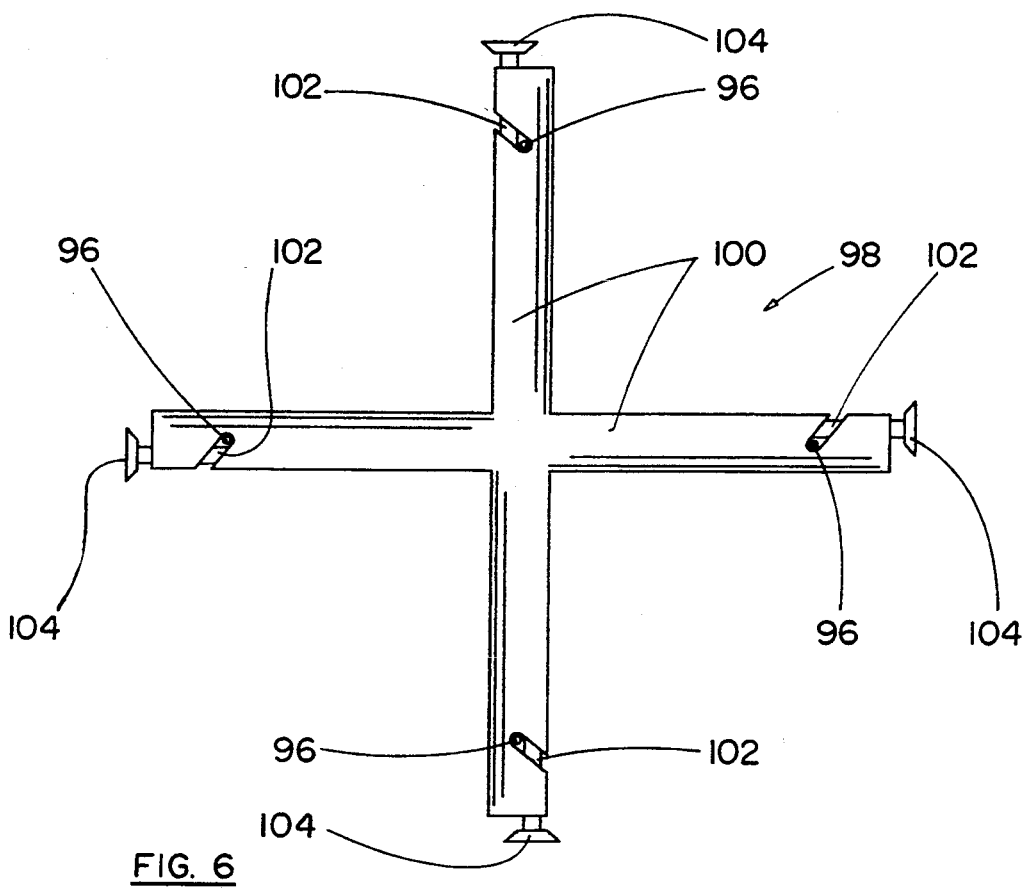
FIG. 6 is a section along line 6—6 of FIG. 5.

FIG. 5 shows the wiring for a single feed control barrier, say of one hundred feet in length, for feeding up to forty cattle. The system can be modified to feed two or more haystacks at the same time where using more slave tracks, all connected to the same master track. One convenient way of doing this is by having a second relay actuated by the timer output to accommodate the addition of slave tracks.

This system provides a complete programmed control for feeding of animals in the feed yard. The timer can be programmed to bring the barrier into the feeding position or the withdrawn position as desired. This controls both the time of and the duration of feeding for the animals. The bell or other alarm associated with the unit is a sonic signal of feeding time for the animals so that they are trained very quickly to respond not only to the movement of the barrier but to the signal.

It will be readily apparent that as the animals eat into the bulk supply of food at the end of the yard, the feeding position of the barrier must be advanced towards the supply of feed. This is done by advancing the limit switches every few days as required. The relatively long rails allow this to be done very easily simply by loosening the set screws on the limit switch clamps and advancing the limit switches to the desired position. In the event that the end of a rail is reached, it is a simple matter of lifting the rails off the fence and moving them forward to another position, while adjusting the limit switch position accordingly. The rear limit switch defining the withdrawn position of the barrier is preferably set about 3 feet from the front switch so that the animals are able to clean up any spilled hay when the unit is in the withdrawn position. This minimizes the waste of hay.

The embodiment described in the foregoing uses fixed type mounting brackets. It is also possible to use adjustable height mounting brackets so that the barrier can be raised or lowered as desired.

While the foregoing has described one particular embodiment of the present invention, it is to be understood that the invention is not limited to that embodiment. The invention is to be considered limited solely by the scope of the appended claims.

I claim:

1. An apparatus for controlling the feeding of animals in a feed yard with a bulk supply of feed stored in the yard, the apparatus comprising:
   barrier means extending across the yard between the animals and the bulk supply of feed;
   barrier moving means for moving the barrier means between a feeding position adjacent supply of feed and a withdrawn position spaced therefrom;
   control means for operating the barrier moving means at predetermined times;
   limit means operatively associated with the barrier moving means for stopping the barrier moving means when the barrier reaches the feeding and withdrawn positions, the limit means being adjustable for advancing the feeding position towards the bulk supply as the feed is progressively eaten back into the bulk supply; and
   timer means operable to cause the barrier moving means to move the barrier means to the feeding position at a predetermined time in each day.

2. Apparatus according to claim 1 wherein the barrier moving means comprise elongate rails extending along opposite sides of the yard and rail followers engaged with the rails and supporting the barrier for movement therealong.

3. Apparatus according to claim 2 wherein the barrier moving means comprise two motors associated with respective ones of the rails, means operatively coupling each motor to a respective one of the rail followers for driving the follower along the associated rail.

4. Apparatus according to claim 3 including control means for controlling the motors to operate simultaneously.

5. Apparatus according to claim 4 wherein the limit means comprise means mounted on at least one of the rails for engagement with the associated rail follower in the feeding and withdrawn positions of the barrier means, the limit means being operable to stop the motors.

6. Apparatus according to claim 1 wherein the timer means are operable to cause the barrier moving means to move the barrier means to the withdrawn position after a predetermined period in the feeding position.

7. Apparatus according to claim 1 wherein the limit means include means for advancing the withdrawn position toward the bulk supply as the feed is progressively eaten into the bulk supply.

8. Apparatus according to claim 1 including a sonic signal and means for actuating the sonic signal as the barrier means is advanced towards the feeding position.

9. Apparatus for controlling the feeding of animals in a feed yard with a bulk supply of feed stored in the yard, the apparatus comprising:
   barrier means extending across the yard between the animals and the bulk supply of feed;
   barrier moving means comprising elongate rails extending along opposite sides of the yard and rail followers engaged with the rails and supporting the barrier for movement therealong between a feeding position adjacent the supply of feed and a withdrawn position spaced therefrom;
   rail mounting means comprising hook means secured to each rail for adjustably suspending the rail on a fence;
   control means for operating the barrier moving means at predetermined times;
   limit means operatively associated with the barrier moving means for stopping the barrier moving means when the barrier reaches the feeding and withdrawn positions, the limit means being adjustable for advancing the feeding position towards the bulk supply as the feed is progressively eaten back into the bulk supply.

10. Apparatus according to claim 9 wherein the rail mounting means comprise means for adjusting the height of the rails.

11. Apparatus for controlling the feeding of animals in a feed yard, with a bulk supply of feed stored in the yard, the apparatus comprising:
   rail means extending along opposite sides of the yard;

barrier means extending across the yard and having two opposite ends thereof mounted on the respective rail means for movement therealong;

barrier moving means for moving the barrier along the rails selectively towards and away from the bulk supply of feed; and control means operable to cause the barrier moving means to advance the barrier means towards the supply of feed at predetermined feeding start times in each day and to withdraw the barrier means from the supply of feed after a predetermined period in the feeding position.

12. Apparatus according to claim 11 including limit means for stopping the barrier moving means in response to the barrier means reaching selected advanced and retracted positions, and limit adjustment means for selectively altering at least the advanced position.

13. Apparatus according to claim 12 wherein the barrier moving means comprise an elongate member extending along each rail, means for connecting the elongate member to a respective end of the barrier and means for moving the elongate member along the rail.

14. Apparatus according to claim 13 wherein the barrier moving means comprise two electric motors associated with respective ones of the rails and means coupling the electric motors to operate simultaneously, and the limit means comprise limit switches engageable by respective ends of the barrier means in the advanced and retracted positions respectively.

15. Apparatus according to claim 14 wherein the limit adjustment means comprise means for adjustably mounting the limit switches on the rails.

16. Apparatus according to claim 11 wherein the barrier means comprise electric conductor means extending across the yard between the opposite ends of the barrier means and means for connecting the conductor means to a source of electric power.

17. Apparatus according to claim 16 wherein the barrier means comprise a plurality of electric conductors, insulating spacers spacing the conductors from one another, means for connecting one of each two adjacent conductors to a supply of electric power and a means for grounding the other of each two adjacent conductors.

18. Apparatus according to claim 16 wherein the barrier means comprise support means at each end of the conductor means, rail follower means engaging each of the rails and resilient tension coupling each support means to the adjacent rail follower means.

19. Apparatus according to claim 18 wherein the rail means comprise respective channels, each having a substantially C-shaped profile and the follower means comprise roller means engageable in the channels.

20. Apparatus according to claim 16 wherein the barrier means comprise an annular array of conductors.

21. Apparatus according to claim 11 including a sonic signal and means for actuating the sonic signal as the barrier means is advanced towards the feeding position.

22. An electric animal barrier comprising a plurality of elongate, substantially parallel, uninsulated electric conductors arranged in an annular array, means for connecting one conductor of each two adjacent conductors to a source of electric power, and means for connecting the other conductors of each two adjacent conductors to ground.

23. A barrier according to claim 22 wherein the barrier includes four conductors.

24. A barrier according to claim 23 including insulating spacers spaced along the barrier and engaging the conductors for maintaining a space therebetween.

25. Apparatus according to claim 23 including support means at each end of the barrier, the conductors being connected to the support means.

26. Apparatus according to claim 25 including resilient means engaged with at least one of the support means for tensioning the conductors.

27. A method of feeding animals confined in a feed yard, comprising:

providing a bulk supply of feed in the yard;

providing barrier means between the animals and the bulk supply of feed at a withdrawn position spaced sufficiently from the feed to prevent animal access to the feed;

a) moving the barrier means to a feeding position adjacent to the feed at selected feeding times to provide animal access to the feed;

b) retaining the barrier means in the feeding position for a predetermined feeding period;

c) withdrawing the barrier means from the feeding position to the withdrawn position after the selected feeding period and before the bulk supply of feed is consumed;

d) repeating steps a), b), and c); and e) advancing the feeding position towards the bulk supply as the feed is progressively eaten back into the bulk supply.

* * * * *